United States Patent [19]

Natsume et al.

[11] Patent Number: 4,591,185
[45] Date of Patent: May 27, 1986

[54] VEHICLE HEIGHT CONTROL SYSTEM

[75] Inventors: Kazuyuki Natsume, Toyohashi; Kaoru Oohashi, Okazaki, both of Japan

[73] Assignees: Nippondenso Co., Ltd., Kariya; Toyota Jidosha Kabushiki Kaisha, Toyota, both of Japan

[21] Appl. No.: 665,066

[22] Filed: Oct. 26, 1984

[30] Foreign Application Priority Data

Oct. 27, 1983 [JP] Japan ................................ 58-202436

[51] Int. Cl.$^4$ ............................................ B60G 17/00
[52] U.S. Cl. ..................................................... 280/707
[58] Field of Search ............... 314/424; 280/707, 6 R, 280/6.1, 6.11; 267/64.16, 65 D

[56] References Cited

U.S. PATENT DOCUMENTS

| 4,017,099 | 4/1977 | Hegel et al. | 280/707 |
| 4,462,610 | 7/1984 | Saito et al. | 280/707 |
| 4,466,625 | 8/1984 | Kondo et al. | 280/707 |

Primary Examiner—Richard A. Bertsch
Attorney, Agent, or Firm—Cushman, Darby & Cushman

[57] ABSTRACT

A vehicle height control system includes a plurality of vehicle height adjusters actuated by a hydropneumatic actuating system and controlled respectively by control signals from a control unit. The control unit calculates, for each of the vehicle height adjusters, a target difference between a target adjustment position and an actual position detected by a vehicle height sensor associated with the adjuster. A maximum target difference is selected from the target differences respectively for the adjusters, and the selected maximum target difference is divided by a predetermined adjusting unit to determine a number of steps for adjustment of the target difference a little amount at a time. Then, tentative- or pseudo-target adjustment positions ranging between the actual position and the target adjustment position are obtained for each adjuster, and the adjustment control of each adjuster is carried out to achieve the pseudo target adjustment positions step by step.

6 Claims, 4 Drawing Figures

VEHICLE HEIGHT CONTROL SYSTEM

BACKGROUND OF THE INVENTION

1. Field of the Invention

The present invention relates to a vehicle body height control system, or more particularly, to a vehicle body height adjusting system with an improved travelling feeling or performance during the process of vehicle body height adjustment. The system of this invention is hereinafter referred to simply as the vehicle height control system.

The present invention is applicable to a vehicle height control system comprising a vehicle height adjuster for each of the wheels (a single vehicle height adjuster may be provided for all of the rear wheels) for controlling the distance between each wheel and the vehicle body, that is, the vehicle body height, with each adjuster operating independently.

2. Description of the Prior Art

A vehicle height control system has been proposed heretofore, in which the vehicle height is controlled at a target level by employing a plurality of vehicle height adjusters in order to attain a desired vehicle height in response to the number of passengers, the amount of loads, the travelling conditions and the road surface conditions on which the vehicle is travelling.

In such a conventional vehicle height control system, when all the vehicle height adjusters are extended or contracted by the same length, the extension or contraction rate (the adjusting rate) would be different between the respective vehicle height adjusters due to the differences in the loads on or in the suspension spring characteristics of the respective vehicle height adjusters.

This variation in the adjusting rate causes an unstable slant of the vehicle body under adjustment and undesirably makes the driver and passengers (hereinafter simply called "the driver") feel uneasy.

This problem is attributable to the fact that each of the vehicle height adjusters is extended or contracted regardless of the adjusting rates of the other vehicle height adjusters.

The present invention is intended to obviate the above-mentioned disadvantage of the prior art system.

SUMMARY OF THE INVENTION

The primary object of the present invention is to provide an improved vehicle height control system which gives an improved travelling feeling or performance during the process of vehicle height adjustment.

In order to achieve the above-mentioned object, the present invention provides a vehicle height control system wherein, in order to make it possible for each of the vehicle height adjusters to operate in coordination with the other vehicle height adjusters, a pseudo-target adjustment position is set sequentially for each of the vehicle height adjusters in accordance with the result of the adjustment thereof, and the adjustments of the respective vehicle height adjusters are performed in harmony with each other in accordance with the actual adjustment positions and the set pseudo-target adjustment positions. Namely, the present invention provides a vehicle height control system wherein actual positions resulting from the adjustment of a plurality of vehicle height adjusters are fed back to a control means which operates to compensate for variations in the adjusting procedure among the vehicle height adjusters.

Thus, the vehicle height control system of this invention comprises a plurality of vehicle height adjusters adapted to operate in response to a control signal, position signal generator means for generating an actual position signal in accordance with the result of the adjustment of the respective adjusters, setting means for changing target adjustment positions of the adjusters, and control means for setting a pseudo-target adjustment position in accordance with a target difference between the actual position and the target adjustment position of each adjuster periodically and generating a control signal for actuating each adjuster in accordance with the pseudo-target adjustment position and the actual position thereof.

DESCRIPTION OF THE PREFERRED EMBODIMENTS

Figure 1:
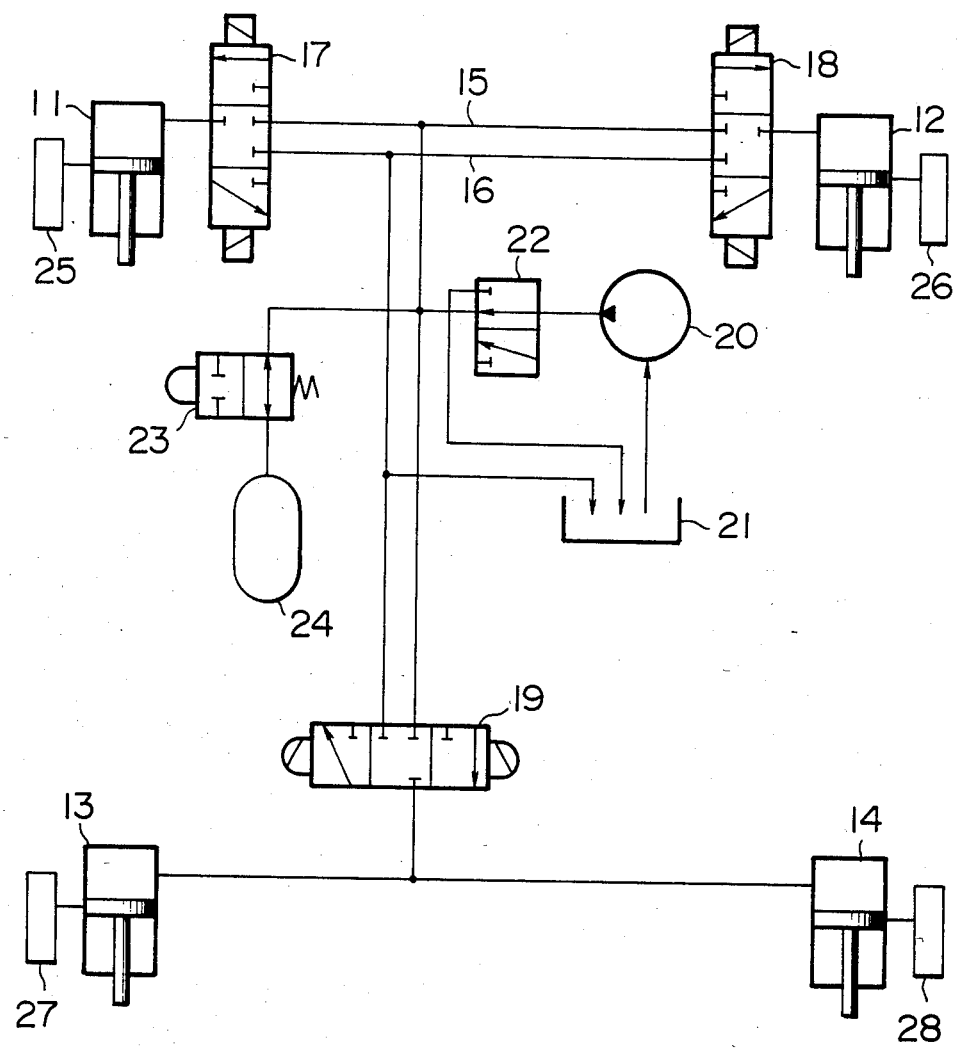
FIG. 1 is a schematic diagram showing an arrangement of the vehicle height adjusters of an embodiment of the present invention.

FIG. 1 shows an arrangement of vehicle height adjusters of the present invention as applied to a hydropneumatic suspension system. In FIG. 1, reference numerals 11 to 14 designate shock absorbers, or, in particular, vehicle height adjusting sections thereof, which are provided for respective wheels of a four-wheeled vehicle. The shock absorbers 11, 12 for the front wheels, combined with normally-closed three-position solenoid valves 17, 18 capable of switching the connection between an oil supply passage 15 and an oil drain passage 16, form respective vehicle height adjusters capable of adjusting the distance between the wheels and the vehicle body, that is, the vehicle height. The shock absorbers 13, 14 for the rear wheels, on the other hand, combined with a three-position solenoid valve 19, similarly capable of switching the connection between the oil supply passage 15 and the oil drain passage 16 in common to both shock absorbers 13, 14, form other vehicle height adjusters.

In the oil supply/drain system, an electrically-operated oil hydraulic pump 20 supplies oil pumped up from a reservoir 21 to the oil supply passage 15 through a regulation valve 22. The regulation valve 22 functions to connect the pump 20 to the reservoir 21 when the oil supply pressure is higher than a set level. The oil supply passage 15 is connected via a normally-closed solenoid valve 23 to an accumulator 24 whereby the oil supply pressure is prevented from pulsating.

Each vehicle height adjuster operates in such a manner that upon energization of each of the solenoid valves 17 to 19 to a position connecting the shock absorbers 11, 12 and 13, 14 with the oil supply passage 15, oil is supplied into the vehicle height adjusting cylinder of each of the shock absorbers 11 to 14, respectively, thereby to increase the vehicle body height against the vehicle body load, while upon energization of the solenoid valve to a position connecting the shock absorbers 11, 12 and 13, 14 to the oil drain passage 16, on the other hand, oil is drained from the cylinder thereby to decrease the vehicle height.

The shock absorbers 11 to 14 are provided with vehicle height sensors 25 to 28 for generating an actual position signal indicative of the vehicle height corresponding to the result of the adjustment of the respective vehicle height adjusters. Each vehicle height sensor may be of a well-known photo-electric or inductance type and generates a signal changing stepwise or continuously in correspondence with the vehicle height.

Figure 2:
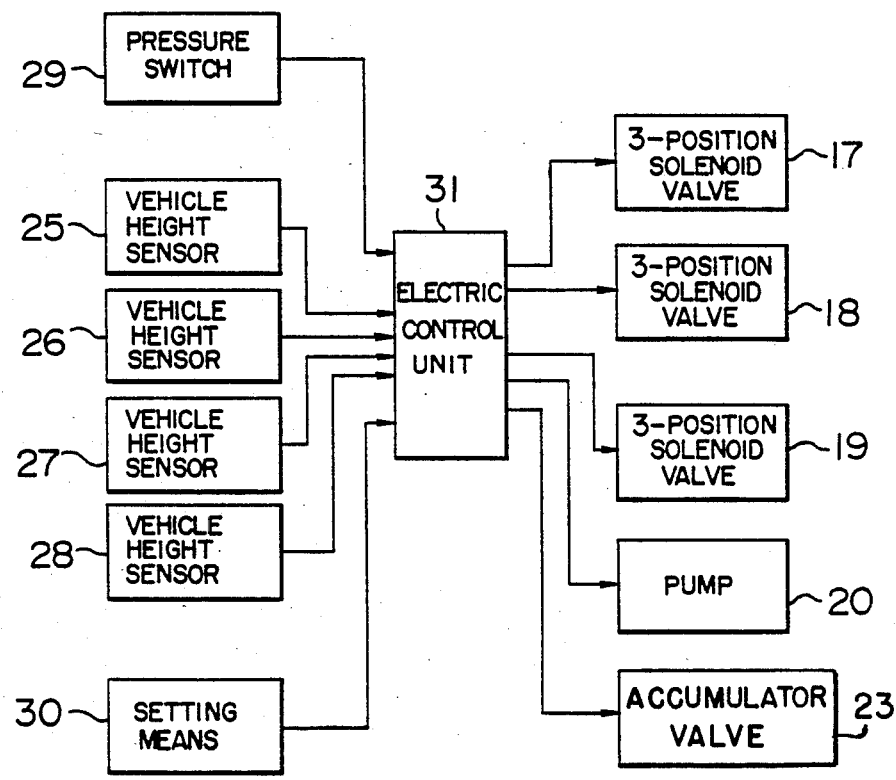
FIG. 2 is an electric circuit diagram of the system of this invention.

FIG. 2 shows a construction of the electrical circuit of this system. Numeral 29 designates a pressure switch for generating a signal when the pressure in the oil supply passage 15 exceeds a set value. This pressure switch is appropriately positioned in the oil supply passage 15, and the signal therefrom is used to actuate a solenoid valve 23 connected with the accumulator 24.

The setting means designated by numeral 30 generates a change signal for changing the target adjustment position to control the vehicle height. The change signal is generated in relation to at least one of the factors corresponding to the number of passengers and the amount of loads, the travelling conditions, the road surface conditions such as a slant of the road surface, the operation of a manual switch, etc., as is well known in the art.

Signals generated from the vehicle height sensors 25 to 28, the pressure switch 29 and the setting means 30 are applied to an electric control unit 31. The electric control unit 31 comprises an operating circuit (microcomputer) for performing a processing operation in accordance with a predetermined computer program, and an input/output interface for applying the input signal to the operating circuit and transmitting an output signal corresponding to the result of operation of the operating circuit to an external circuit.

Figure 3:
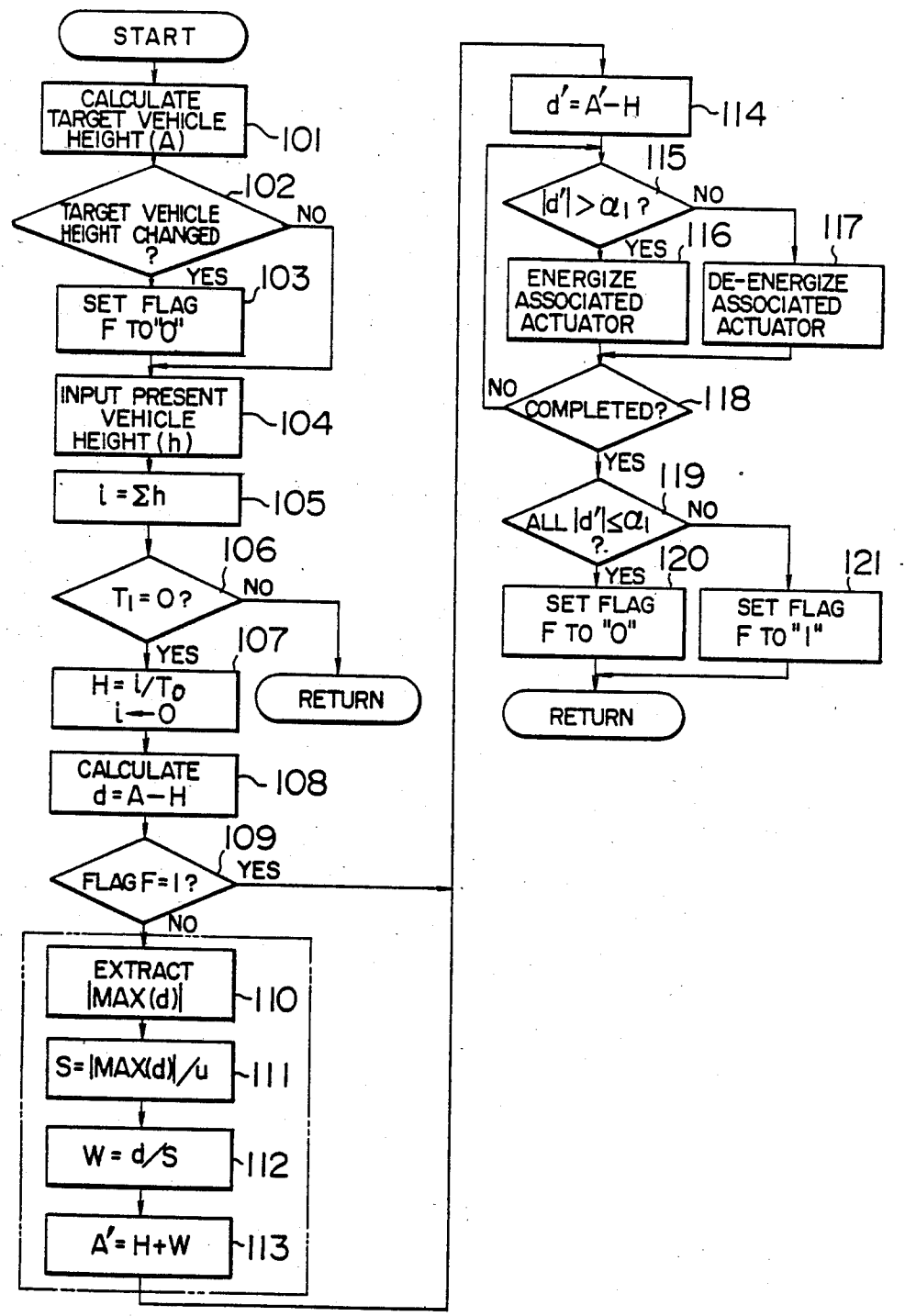
FIG. 3 is a flowchart of a control program for the operating circuit comprised in the electric control unit shown in FIG. 2.

FIG. 3 shows essential parts of a vehicle height control program used in the present invention which is executed by the operating circuit of the electric control unit 31. The program shown in FIG. 3 controls the processes of the vehicle height adjustment repeatedly. To this control program is added another control program, not shown, for applying an operating signal to the electrically-operated pump 20 when a main switch, not shown, is switched on upon turning on of a vehicle key switch.

The operation of this system will be explained with reference to the vehicle height control program. Firstly, at a program step 101 shown in FIG. 3, the operating circuit of the electric control unit 31 calculates (sets) data A indicative of a target adjustment position (target vehicle height) for each of the vehicle height adjusters on the basis of the change signal supplied thereto from the setting means 30. As a result, target positions $A_1$, $A_2$ and $A_3$ for the respective adjusters are obtained separately which assume predetermined values, respectively, in relation to the change signal. The target position $A_1$ represents a target value for the front left wheel, $A_2$ that for the front right wheel, and $A_3$ that for the two rear wheels (an average value).

Next, at step 102, the operating circuit checks to decide whether the target adjustment position calculated at step 101 has been changed from a preceding value, and if it has been so changed, the flag F is set to "0" at step 103.

The next step 104 inputs actual position signals generated by the vehicle height sensors 25 to 28, and stores them as data h indicative of actual instantaneous vehicle heights. The data h comprises three vehicle height data $h_1$, $h_2$ and $h_3$ including an average value for the two rear wheels. The vehicle height data h are accumulated at step 105 thereby to calculate data i ($i_1$, $i_2$, $i_3$) representing the accumulated vehicle heights in a given set time length $t_1$. Step 106 determines the set time length $t_1$ by monitoring the timer data $T_1$ which are periodically reduced to zero by being updated by the counting-up caused by a timer routine not shown.

Upon the lapse of the set time length $t_1$, the operating circuit excecutes step 107. At step 107, each of the accumulated vechicle height data i is divided by the set data $T_0$ corresponding to the set time length $t_1$ thereby to calculate average vehicle height data H ($H_1$, $H_2$, $H_3$) indicative of the actual position. In subsequent control program steps, this average vehicle height data H will be called the vehicle height data. Further, step 107 clears the accumulated vehicle height data i to zero.

Step 108 calculates differences between the vehicle height data H (actual position) and the target adjustment position A for the respective adjusters, that is, the target differences d ($d_1$, $d_2$, $d_3$).

Next, step 109 checks the condition of the flag F, and the program for setting a pseudo-target adjustment position is executed at steps 110 to 113 only when the target adjustment position A is changed. The pseudo-target adjustment position is set as mentioned below. Firstly, step 110 extracts the maximum absolute value |MAX(d)| of the target differences d, and in the next step 111 the value MAX(d) is divided by a predetermined vehicle height adjusment unit u thereby to calculate finally the number of adjustment steps S necessary for determining the target adjustment position.

At step 112, the target difference d ($d_1$, $d_2$, $d_3$) for each adjuster is divided by the step number S thereby to obtain the adjusting width W ($W_1$, $W_2$, $W_3$) for each adjusting step for the respective vehicle height adjusters.

Further, at step 113, the adjusting width W ($W_1$, $W_2$, $W_3$) is added to the vehicle height data H ($H_1$, $H_2$, $H_3$), respectively, for respective vehicle height adjusters, thereby obtaining a provisional target adjustment position (namely, a pseudo-target adjustment position) A'.

Next, the operating circuit of the electric control unit 31 performs an adjusting operation for each adjuster aiming at the pseudo-target adjustment position at steps 114 to 121, respectively. The step 114 calculates a new difference d' between the pseudo-target adjustment position A' and the vehicle height data H for the respective vehicle height adjusters as a new target difference. The step 115 compares the new target difference d' for an adjuster with a preset tolerance $\alpha_1$, and if the new target difference d' exceeds the tolerance $\alpha_1$, the step 116 produces an output signal for energizing an associated three-position solenoid valve. In the processing at the step 116, if the target difference d' is positive, an energizing signal for connecting the associated shock absorber with the oil supply passage 15 is produced, while, if the target difference d' is negative, an energizating signal for connecting the associated shock absorber with the oil drain passage 16 is produced. When the target difference d' is within the tolerance $\alpha_1$, on the other hand, step 117 does not supply any energizing signal to the three-position solenoid valve but it deenergizes the three-position solenoid valve.

Further, in the step 116, when an energizing signal for connecting the associated shock absorber with the oil supply passage 15 is generated from the electric control unit 31, a signal from the pressure switch 29 is checked, and if this signal indicates a pressure higher than a predetermined level, an output signal for energizing and opening the solenoid valve 23 connected with the accumulator 24 is produced to prevent the oil supply pressure from rising suddenly.

The adjusting processes in steps 115 to 117 are executed sequentially for the respective vehicle height adjusters until the completion of the adjusting operation for all the adjusters is confirmed at step 118. Upon completion of the adjusting operation for all the adjusters, step 119 checks to decide whether the respective target differences d' are within the tolerance $\alpha_1$. If all the target differences d' stay within the tolerance $\alpha_1$, the execution of the control program is decided to have been completed, and step 120 sets the flag F to "0", and the execution of the control program is started again from step 101. In the process of returning from step 120 to step 101, the energizing signal supplied to the solenoid valve 23 is cancelled.

As seen from the above description, the processing is returned from step 120 to step 101 when the actual vehicle height H coincides with the pseudo-target adjustment position A' within the tolerance $\alpha_1$ for each adjuster. On the other hand, when the target difference d' exceeds the tolerance $\alpha_1$, step 121 sets the flag F to "1" and the execution of the control program is started again from step 101. Accordingly, the adjustment operation at the steps 114 to 118 are repeated using the same pseudo-target adjustment position A'. When the actual positions for all the adjusters approach the pseudo-target adjustment positions to stay within the tolerance, step 120 sets the flag F to "0".

In other words, when the flag F is "0", it indicates that the pseudo-target adjustment positions are satisfied. In this case, the resetting of pseudo-target adjustment positions is effected in steps 110 to 113, and the calculation of the adjusting width W is repeated as explained above and a new pseudo-target adjustment position A' is calculated.

In this system, as described above, the calculation of the pseudo-target adjustment positions and the adjustment control aiming at the calculated pseudo-target adjustment positions are repeated at short intervals, whereby the actual positions of the respective adjusters can gradually approach the target adjustment positions A with the adjusting widths prevented from becoming extremely different from each other among the plurality of vehicle height adjusters.

The system of this invention is advantageous in the adjusting operation of a plurality of vehicle height adjusters, in which the vehicle height on the front wheels alone is increased or decreased from a certain vehicle height level, or the vehicle height on one of the front and rear wheels is increased or decreased while that on the other thereof is decreased or increased, respectively, or the all the adjusters are extended or contracted.

Figure 4:
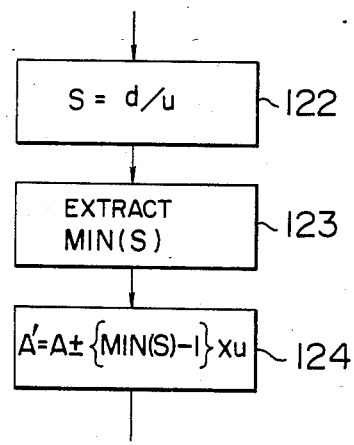
FIG. 4 is a partial flowchart for explaining an embodiment of this invention including a partial modification of the flowchart shown in FIG. 3.

In embodying the present invention, the setting of the pseudo-target adjustment position A' may be effected by a method shown in FIG. 4 in place of the method shown by the steps 110 to 113 surrounded by the dashed line in FIG. 3.

In such a method shown in FIG. 4, step 122 divides the target difference d ($d_1$, $d_2$, $d_3$) for each adjuster by a predetermined vehicle height adjustment unit u to obtain the number of adjusting steps S ($S_1$, $S_2$, $S_3$) required to reach the target adjustment position A for each adjuster. Further, the minimum number of steps MIN(S) therein is extracted at step 123.

Then, at a next step 124, by taking into consideration the minimum step number MIN(S), the pseudo-target adjustment position A' of each adjuster is calculated by the following equation.

$$A' = A \pm \{MIN(S) - 1\} \times u$$

With respect to the sign $\pm$ in the above equation, the negative sign is selected when the target difference d is positive, while, the positive sign is selected when the target difference d is negative.

The present invention is also applicable to a vehicle equipped with vehicle height adjusters using an air suspension, in which case the oil supply/drain system may be replaced by a compression air supply/ exhaust system. In the case of the air suspension system, since the adjusting speed of the adjusters is considerably slow, it is necessary to increase the set time length $t_1$ when the control program shown in FIG. 3 is used.

Furthermore, in the construction of the above-described embodiment, individual parts may be replaced by equivalent parts termed differently, or the control program for the operating circuit may be altered partially, if necessary.

Further, the number of the vehicle height adjusters and the arrangement of the vehicle height adjusters adjustably mounted on the respective wheels of a vehicle may be selected as desired in the embodiment of the present invention.

It will be understood from the foregoing description that, the present invention is advantageous in that a plurality of vehicle height adjusters are adjusted in harmony with each other by setting a pseudo-target adjustment position for each adjuster at short time intervals, while taking into consideration the result of the adjustment of the respective adjusters, so that it is possible to effect stable vehicle height control without causing any unbalanced inclination of the vehicle body during the process of height adjustment thereof, thereby assuring an improved travelling feeling or performance.

We claim:

1. A vehicle height control system comprising:
    a plurality of vehicle height adjusters for performing adjusting operation in response to respective control signals;
    position signal generator means for generating actual position signals each representing a vehicle height of a corresponding one of said vehicle height adjusters;
    setting means for changing target adjustment positions of said vehicle height adjusters respectively; and
    control means for generating the respective control signal for each of said vehicle height adjusters in accordance with a target difference between the target adjustment position and the actual position signal to adjust the vehicle height to achieve the target adjustment position,
    said control means dividing said target difference for each vehicle height adjuster into a plurality of unit adjusting widths,
    said control means, at a first stage, obtaining a pseudo-target adjustment position by a combination of the unit adjusting width and the actual position signal, and controlling each of said vehicle height adjusters to achieve the pseudo-target adjustment position, said control means, upon completion of the first stage adjustment, at a second stage obtaining a next pseudo-target adjustment position from said unit adjusting width and the actual position signal at this time, and controlling each of said vehicle height adjusters to achieve the next pseudo-target adjustment position, and said control means thereafter repeating the above control for vehicle height adjustment until said target adjustment positions for said vehicle height adjusters are achieved.

2. A system according to claim 1, wherein said control means obtains said unit adjusting width separately for each of said vehicle height adjusters.

3. A system according to claim 1, wherein said control means selects a maximum value from said target differences for said vehicle height adjusters, and divides said maximum value by a predetermined adjusting unit, and obtains said unit adjusting width based on the resultant value of the division.

4. A system according to claim 1, wherein said control means divides the target differences for said vehicle adjusters respectively by a predetermined adjusting unit, and selects a minimum value from the resultant divided values, and said unit adjusting width for each vehicle adjuster is obtained based on said minimum value.

5. A system according to claim 1, wherein said vehicle height adjusters are actuated by a plurality of actuating systems including two systems corresponding to right and left front wheels, and one system for adjusting right and left rear wheels simultaneously.

6. A vehicle height control system comprising:

a plurality of vehicle height adjusters for performing adjusting operation in response to respective control signals;

position signal generating means for generating actual position signals each representing a vehicle height of a corresponding one of said vehicle height adjusters;

setting means for changing target adjustment positions of said vehicle height adjusters respectively; and control means for generating the respective control signal for each of said vehicle height adjusters in accordance with a target difference between the target adjustment position and the actual position signal to adjust the vehicle height to achieve the target adjustment position, said control means dividing an adjusting amount, for each of said vehicle height adjusters from the actual position to reach the target adjustment position, into a plurality of stages, said control means obtaining pseudo-target adjustment positions for respective said vehicle height adjusters at a first stage, and controlling all said vehicle height adjusters toward said pseudo-target adjustment positions, said control means, upon completion of the control in the first stage, updating the pseudo-target adjustment positions and repeating the adjusting control of said vehicle height adjusters.

* * * * *